UNITED STATES PATENT OFFICE.

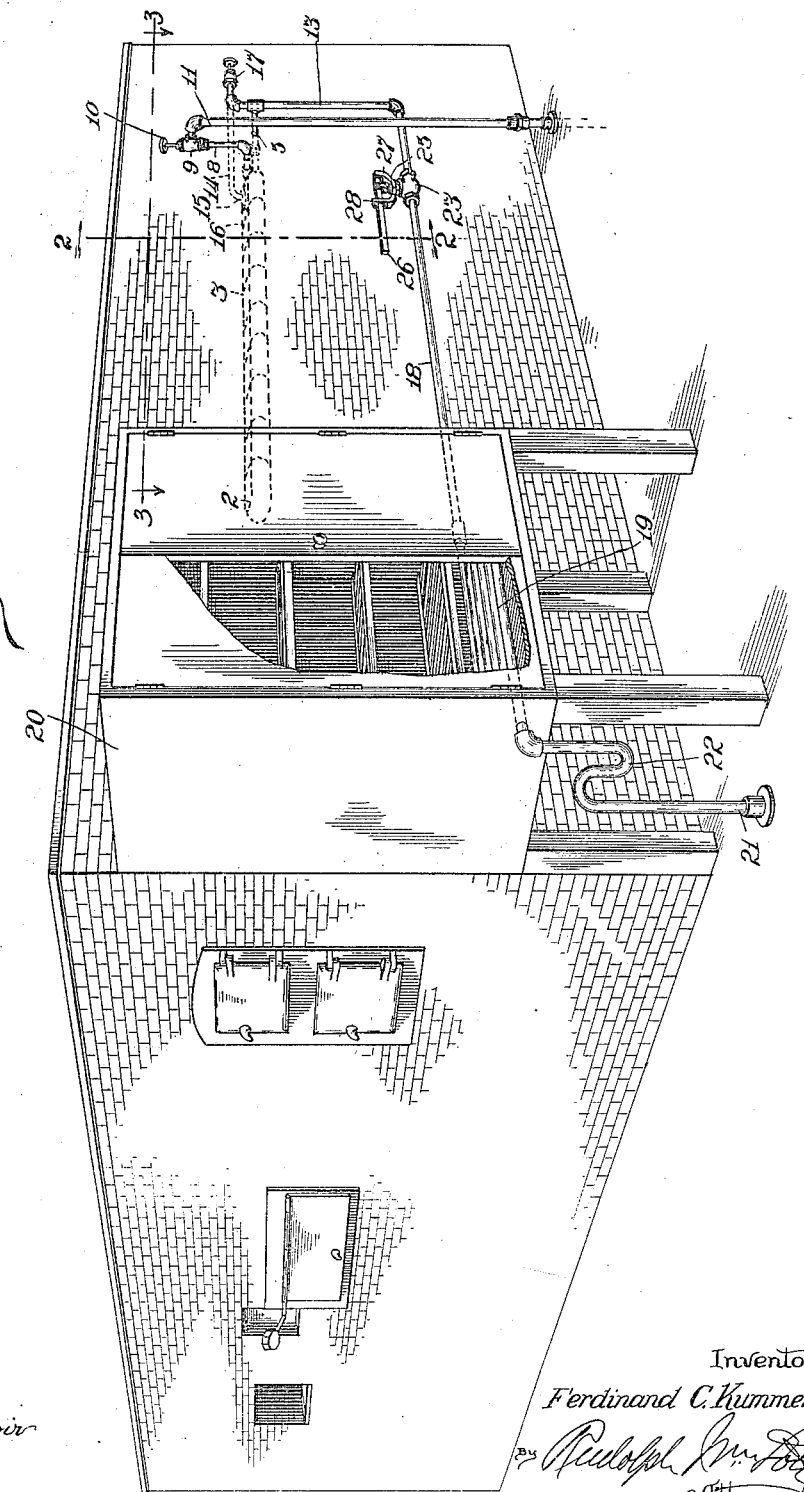

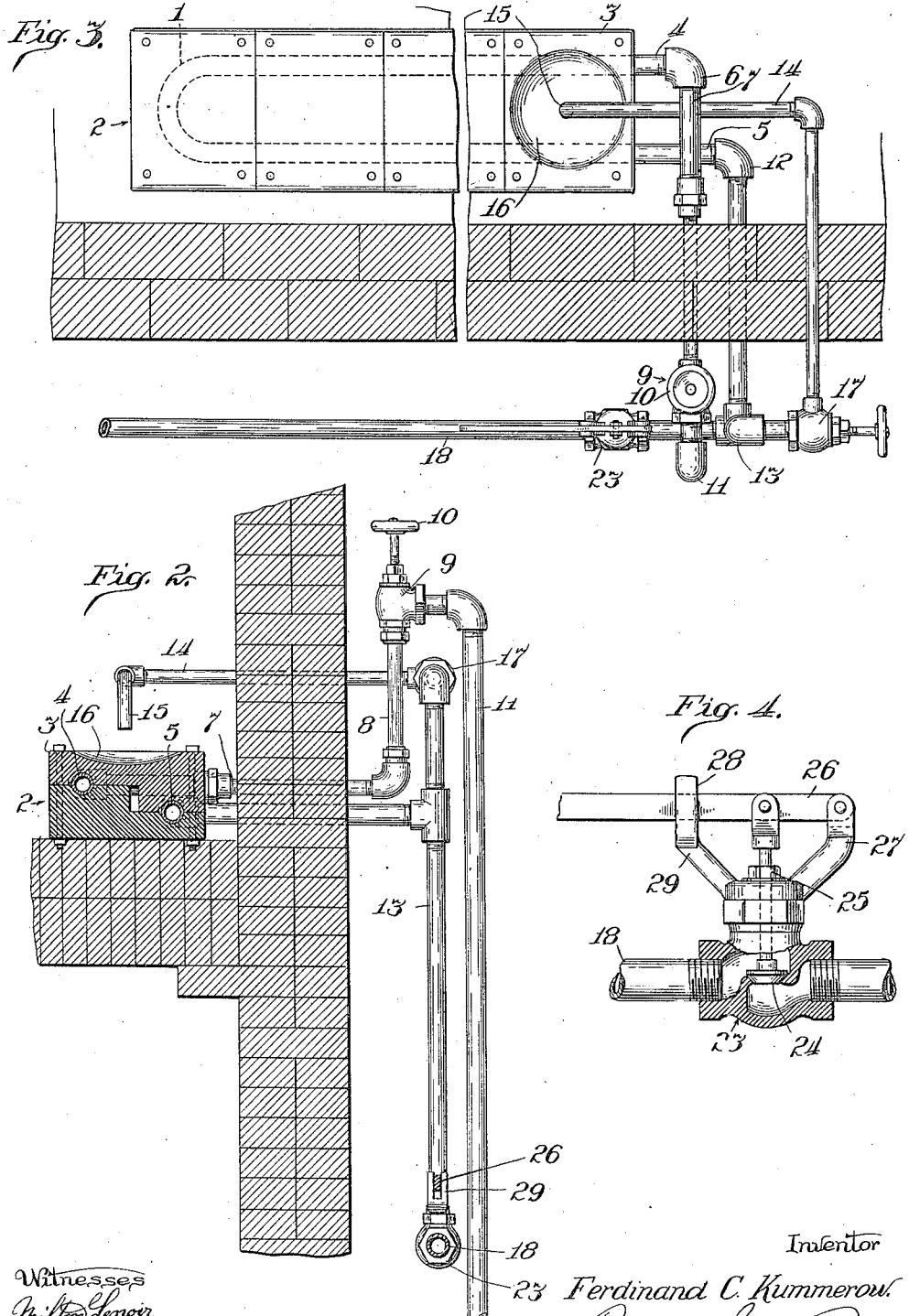

FERDINAND C. KUMMEROW, OF CHICAGO, ILLINOIS.

STEAM-SUPPLY MEANS FOR BAKERIES.

1,293,477.  Specification of Letters Patent.  Patented Feb. 4, 1919.

Application filed September 4, 1917. Serial No. 189,710.

*To all whom it may concern:*

Be it known that I, FERDINAND C. KUMMEROW, citizen of the United States, residing at Chicago, in the county of Cook and State of Illinois, have invented certain new and useful Improvements in Steam-Supply Means for Bakeries; and I do hereby declare the following to be a full, clear, and exact description of the invention, such as will enable others skilled in the art to which it appertains to make and use the same.

This invention relates to improvements in bakers' ovens, and has for its object to provide means for cheaply and efficiently supplying steam to the interior of the oven, and at the same time supplying steam for heating a radiator or warming oven separately from the bake oven without effecting an appreciable absorption of heat from the bake oven. A further object of the invention is to provide substantially automatic steam generating means for supplying the oven and a warming oven which will require little or no attention on the part of the baker, and which is extremely economical and easily operated and controlled.

The invention consists in the features of construction and combinations of parts hereinafter fully described and particularly claimed.

In the accompanying drawings illustrating a suitable embodiment of the invention:

Figure —1— is a perspective view of a baker's oven equipped with steam generating and supplying means constructed in accordance with my invention.

Fig. —2— is a fragmentary detail view partly in section and partly in elevation showing the steam generating and distributing means on an enlarged scale.

Fig. —3— is a fragmentary detail plan section on the line 3—3 of Fig. —1—, further illustrating the relative locations of the elements of the invention.

Fig. —4— is a fragmentary detail view partly in side elevation and partly in section of a valve employed.

The invention consists essentially in disposing within a baker's oven, preferably in that portion thereof which is nearest contiguous to the furnace, and which is accordingly subjected to the greatest heat, a coil 1 consisting of a piece of suitable piping in preferably U-shaped form. This may be laid upon the oven floor contiguous preferably to a side wall thereof and housed within a jacket consisting of a plurality of cast iron plates 2 and 3 having grooves in their opposed faces in which the two arms of the coil 1 and the middle portion thereof are adapted to be received. The two arms of the coil 1 are preferably disposed so that at least one thereof is upwardly inclined and its end 4 disposed at a higher elevation than the corresponding end 5 of the other arm. The said end 4 is connected by means of an elbow 6 with a pipe 7 which communicates with the lower end of a glass tube 8, the upper end of which enters the discharge end of a needle-valve housing 9, having a manually operable stem 10. The said valve housing 9 is connected with a water service pipe 11 from which it receives a continuous supply of water. The needle valve 10 is adapted to control the flow of water into the coil 1 and to engage the operation to adjust such flow so as to limit to a drop by drop supply. This is adapted to keep the coil 1 entirely free of water inasmuch as the drops of water entering the same when hot will be instantly converted into steam which will flow in the direction of least resistance. This is obviously primarily in the direction of the end 5 of the other arm of the coil from that which the water primarily enters, and said other arm is connected by means of the elbow 12 with a steam supply pipe 13 between the ends of the latter. The upper end of said steam supply pipe 13 connects with a steam discharge pipe 14 which enters the oven and has a discharge end 15 disposed above the jacket member 3, the latter being provided with a concave recess 16 upon the bottom of which the jet of steam is adapted to impinge. The said pipe 14 is controlled by a manually operable valve 17 which permits the supply of steam to be shut off from the oven when desired.

The pipe 13 connects at its other end with a horizontal pipe 18 communicating with a radiator 19 disposed in the bottom of a warming oven 20 disposed adjacent to the oven containing the coil 1. This warming oven 20 is adapted to receive the pans containing dough which requires to be raised previous to introduction into the oven. The other end of the radiator 19 communicates with a discharge pipe 21 leading to the sewer. Interposed in said pipe 20 is an S- shaped trap 22 which is adapted to maintain a water column for resisting the free flow of steam to the sewer 21.

Interposed in the pipe 18 is a valve 23, which may be termed a safety valve, which is shown in detail in Fig. —4—. Said valve comprises the housing provided between its ends with a valve seat on which the valve 24 seats. The stem of the latter is reciprocably mounted in a stuffing box 25 of suitable construction, and which is connected at its upper end to a lever 26 between the ends of the latter. Said lever is pivotally connected at one end to an arm 27 rigid with the valve housing and extends through a forked guide 28 at the outer end of an arm 29, also rigid with the valve housing. The free end of the lever 26 is adapted to receive a weight if it is desired that the same shall resist a comparatively high pressure, but, for the purposes of this invention the weight is preferably omitted and the weight of the lever 26 in itself relied upon to sufficiently resist the free passage of steam into the radiator to maintain a given maximum pressure within the coil 1. The valve 24 will obviously open as soon as the steam pressure on the underside thereof is sufficient to overcome the pressure of the lever 26 thereon. This may obviously be readily regulated, as desired, but ordinarily it is desirable to maintain a pressure of about two pounds per square inch in the coil 1. Accordingly, the pressure on the valve 24 imposed by the lever 26 is adjusted so that as soon as the pressure in the coil 1 exceeds two pounds said valve will open and admit steam to the radiator 19. The height of water column maintained in the trap 22 is preferably sufficient to maintain a steam pressure of one-half pound per square inch in said radiator, and accordingly there is very little back pressure offered to resist the opening of the valve 24, but such back pressure may obviously be compensated for by reducing the load imposed by the lever 26. It is also obvious that the valve 24 may be disconnected from the lever 26 and resist the passage of the steam by its own weight only if it is desired to maintain the pressure in the coil 1 at a very low point.

The advantages of my construction are, first that the feeding of the water to the coil 1 drop by drop will not effect the absorption of any appreciable number of heat units from the oven, and will thus prevent chilling of that portion of the oven containing the coil 1. At the same time the sight feed of water will enable the baker to very readily control the volume of steam generated by merely turning the needle valve 9 to vary the rapidity of feed of drops of water into the same in an obvious manner. Thus there is generated only the volume of steam actually required to maintain the requisite degree of moisture in the oven proper, and to properly maintain the radiator 19 hot. The steam generation may be instantly discontinued by closing the valve 9, but at the same time if the valve 9 should accidentally remain open after the baking operation has been completed there can be no harmful result or waste of fuel. Obviously, my said device is further advantageous in that a single fire is utilized for heating the oven and generating steam, and this fire requires regulation only to maintain the oven at a proper temperature and without regard to the generation of steam. It thus gives the further advantage of eliminating the necessity of maintaining a separate steam boiler in operation to supply steam to the oven and to the radiator or radiators 19 used in all bakeries. It thus affords not only a very advantageous but a very cheap, efficient, safe and easily operated installation adapted to all the needs of the baker.

While I have shown the preferred embodiment of the invention in the accompanying drawings, it will be obvious, of course, that the specific arrangement and the specific details of construction shown and described may be changed and varied at will without departing from the invention as defined in the appended claims.

I claim as my invention:

1. In an oven, a steam generating element, a water supply pipe therefor, a needle-valve controlling the supply of water to said generator and adapted to feed same drop by drop, a steam pipe connected with said generator, a valve-controlled branch pipe for delivering steam into the oven, a radiator externally of the oven into which said steam pipe discharges, a discharge pipe for said radiator, and means in said discharge pipe for maintaining a predetermined minimum steam pressure in said radiator.

2. In an oven, a steam generating element, a water supply pipe therefor, a needle-valve controlling the supply of water to said generator and adapted to feed same drop by drop, a steam pipe connected with said generator, a valve-controlled branch pipe for delivering steam into the oven, a radiator externally of the oven into which said steam pipe discharges, a discharge pipe for said radiator, and a trap in said discharge pipe for maintaining a predetermined minimum steam pressure in said radiator.

3. In an oven, a steam generating element, a water supply pipe therefor, a needle-valve controlling the supply of water to said generator and adapted to feed same drop by drop, a steam pipe connected with said generator, a valve-controlled branch pipe for delivering steam into the oven, a radiator externally of the oven into which said steam pipe discharges, and a valve interposed in said discharge pipe adapted to be automatically opened to supply said radiator when the steam pressure in said generator attains a predetermined point.

4. In an oven, a steam generating element, a water supply pipe therefor, a needle-valve controlling the supply of water to said generator and adapted to feed same drop by drop, a steam pipe connected with said generator, a valve-controlled branch pipe for delivering steam into the oven, a radiator externally of the oven into which said steam pipe discharges, and a valve interposed in said discharge pipe adapted to be automatically opened to supply said radiator when the steam pressure in said generator attains a predetermined point, a discharge pipe for maintaining a predetermined minimum steam pressure in said radiator.

5. In an oven, a steam generating element, a water supply pipe therefor, a needle-valve controlling the supply of water to said generator and adapted to feed same drop by drop, a steam pipe connected with said generator, a valve-controlled branch pipe for delivering steam into the oven, a radiator externally of the oven into which said steam pipe discharges, and a valve interposed in said discharge pipe adapted to be automatically opened to supply said radiator when the steam pressure in said generator attains a predetermined point, a discharge pipe for said radiator, and a trap in said discharge pipe for maintaining a predetermined minimum steam pressure in said radiator.

6. Means for supplying steam to bakers' ovens including a heating coil within the oven, means for supplying water drop by drop to said coil for generating steam at intervals while maintaining said coil free of water, a jacket for protecting said coil, a pocket in the upper surface of said jacket, and a steam supply pipe for discharging the generated steam into the said pocket.

7. Means for supplying steam to bakers' ovens including a heating coil within the oven, means for supplying water drop by drop to said coil for generating steam at intervals while maintaining said coil free of water, means for distributing the generated steam and discharging water of condensation from the steam-distributing means, and means for utilizing the excess steam including a radiator, a pipe connecting the same with said coil, and a fluid-pressure actuated valve interposed in said pipe and adapted to automatically open to supply said radiator when the steam pressure attains a predetermined point.

FERDINAND C. KUMMEROW.

Copies of this patent may be obtained for five cents each, by addressing the "Commissioner of Patents, Washington, D. C."